United States Patent [19]

Miyake et al.

[11] Patent Number: 4,827,332
[45] Date of Patent: May 2, 1989

[54] STILL VIDEO CAMERA WITH COLOR BALANCE ADJUSTMENT CIRCUIT RESPONSIVE TO SHUTTER RELEASE SWITCH AND STROBE LIGHT READY SIGNAL

[75] Inventors: Izumi Miyake; Kiyotaka Kaneko, both of Kawasaki; Kimihide Takahashi; Kazuya Oda, both of Tokyo, all of Japan

[73] Assignee: Fuji Photo Film Co., Ltd., Kanagawa, Japan

[21] Appl. No.: 90,513

[22] Filed: Aug. 28, 1987

[30] Foreign Application Priority Data

Aug. 29, 1986 [JP] Japan ................. 61-201681

[51] Int. Cl.⁴ .......................... H04N 9/73; H04N 9/04
[52] U.S. Cl. ........................................ 358/29; 358/41; 358/909
[58] Field of Search ................... 358/29 C, 41, 43, 44, 358/50, 909

[56] References Cited

U.S. PATENT DOCUMENTS 4,499,487  2/1985  Takayama et al. ............. 358/29 C

FOREIGN PATENT DOCUMENTS 58-147721  9/1983  Japan .
60-143090  7/1985  Japan ............... 358/29 C
61-128694  6/1986  Japan .

Primary Examiner—Edward L. Coles, Sr.
Assistant Examiner—Randall S. Svihla
Attorney, Agent, or Firm—Birch, Stewart, Kolasch, & Birch

[57] ABSTRACT

A still video camera includes a color temperature sensor for detecting the color temperature of ambient light which is used in the color balance adjustment of video signals outputted from an image pickup system. The camera further includes a strobe emission circuit which produces a signal indicating when strobe emission is capable of being performed. A control circuit controls the adjustment of the color balance of the video signals on the basis of the color temperature detected by the color sensor in the absence of a strobe ready signal. Upon the activation of a shutter release switch, the control unit determines whether or not a strobe ready signal is present. If a strobe ready signal is present, the control unit fixes the color temperature to a predetermined constant value for color balance adjustment. Color balance adjustment is therefore made on the basis of a fixed constant color temperature corresponding to strobe light photography only when strobe light emission is to actually occur and prevents color balance from being adjusted on the basis of the fixed constant color temperature when the strobe emission circuit is in a ready state, but strobe light photography is not to be performed.

4 Claims, 2 Drawing Sheets

STILL VIDEO CAMERA WITH COLOR BALANCE ADJUSTMENT CIRCUIT RESPONSIVE TO SHUTTER RELEASE SWITCH AND STROBE LIGHT READY SIGNAL

BACKGROUND OF THE INVENTION

This invention relates to a still video camera, also referred to as an electronic still camera, for imaging a subject by an electronic image pick-up device and recording the resulting still video signal on a magnetic disc.

Since a still video camera is adapted to process color video signals, adjustment of the color balance of chrominance signals is required. Conventional still video cameras come equipped with a color temperature sensor for measuring the color temperature of an illuminating light inclusive of sunlight, and a color balance adjustment is made based on the color temperature sensed by the sensor.

When a subject is photographed by using a strobe, a flash is emitted and there is a momentary change in color temperature as a result. Though a color adjustment circuit is capable of responding satisfactorily to a momentary flash when a color balance adjustment based on color temperature detection is carried out, the color temperature sensor itself cannot respond fast enough to the flash. This makes it difficult to adjust the color balance.

A camera which performs a color balance adjustment under constant conditions is disclosed in the specification of Japanese Patent Application Laid-Open Publication (KOKAI) No. 58-147721. In the disclosed camera, which is capable of switching between a tungsten light mode and a daylight mode, the photographic mode is fixed in the daylight mode in response to completion of preparations for strobe light emission. However, the camera merely fixes the color temperature at the completion of the strobe light emission preparations, so that the fixed color temperature does not relate to the actual strobe light emission. Accordingly, problems arise when a still video camera is operated in a movie/still mode as described in the following. Specifically, the still video camera has a video output element for outputting a movie video signal (namely a video signal indicative of a moving or animated picture) of the subject being imaged by the camera lens system. The video output terminal of the element is connected to a video tape recorder or the like to record (and/or display) the moving picture of the subject, and still pictures at certain instants of time are recorded on a magnetic disc within the camera. A strobe is used when taking these still pictures. Consequently, from the moment the preparations for firing the strobe are completed until the actual firing of the strobe, a correct color temperature adjustment cannot be made with regard to the color of the moving picture being recorded on the video tape. As a result, the picture being produced at subsequent playback is of poor quality. Thus there is a need for a still video camera through which it is possible to playback a moving picture adjusted to the same color temperature at all times regardless of whether or not a strobe is used in recording a still image during the recording of a moving image.

SUMMARY OF THE INVENTION

An object of the present invention is to provide a still video camera in which during strobe photography, there is no change in the color of the picture photographed or recorded at the instant the strobe is fired.

According to the present invention, the foregoing object is attained by providing a still video camera comprising a shutter release switch, detecting means for detecting completion of preparations for strobe light emission, a color temperature sensor for sensing color temperature, a color balance adjustment circuit for adjusting color balance of a color signal, and means for ordinarily controlling the color balance adjustment circuit on the basis of a color temperature sensed by the color temperature sensor, and for controlling the color balance adjustment circuit in accordance with a predetermined constant color temperature if the detecting means has detected completion of the preparations for strobe light emission when the shutter release switch has been turned on.

In accordance with the invention, if the strobe is in a state where preparations for the firing thereof have been completed, e.g. if the strobe is in the charged state, when the shutter release button is pressed to initiate photography, a color balance adjustment is made based on a predetermined fixed color temperature conforming to the flash of the strobe, irrespective of the color temperature sensed by the color temperature sensor. Consequently, the video signal obtained represents a picture the color tone of which is the same as that which prevails at times other than when strobe photography is performed. As a result, almost no change in color is produced in the picture recorded on the still video disc and in the moving picture provided by the movie video signal.

Other features and advantages of the present invention will be apparent from the following description taken in conjunction with the accompanying drawings.

DETAILED DESCRIPTION OF THE PREFERRED EMBODIMENT

Figure 1:
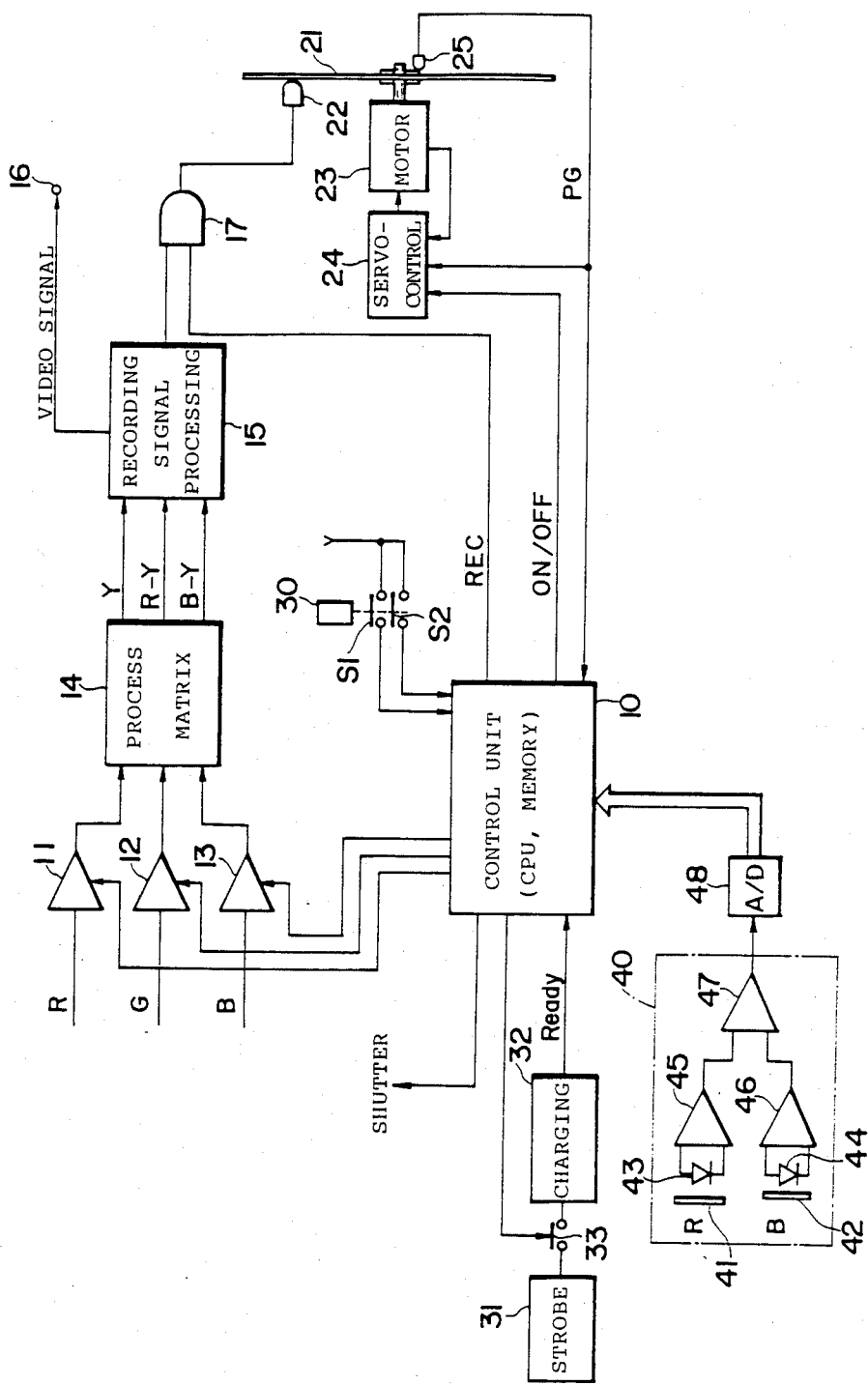
FIG. 1 is a block diagram illustrating part of the electrical circuit construction of a still video camera according to the present invention.

FIG. 1 illustrates part of the electrical construction of a still video camera according to the present invention.

The overall operation of the still video camera is under the control of a control unit 10 comprising such components as a CPU, memory and interface.

The image of a subject formed on a solid-state electronic image pick-up element for the three primary colors R (red), G (green) and B (blue) by means of an optical system composed of lenses, a diaphragm and a color filter is read in the form of video signals for the three colors in synchronism with prescribed horizontal and vertical synchronizing signals. The video signals are inputted to a process matrix circuit 14 via variable-gain amplifier circuits (color balance adjustment circuits) 11, 12 and 13 for R, G and B, respectively. The circuit 14 is adapted to produce a luminance signal Y and two color difference signals R−Y and B−Y, which are inputted to a recording signal processing circuit 15. The latter includes a line sequencing circuit, a pre-emphasis circuit, a frequency modulating circuit and a mixing circuit, none of which are shown. The recording signal processing circuit 15 outputs a frequency-modulated mixed video signal delivered to a gate circuit 17 for recording control purposes. The processing circuit 15 also produces an NTSC format standard color television video signal from the inputted luminance signal and color difference signals and delivers this video signal to an output terminal 16. By way of example, this video signal is recorded on a video tape recorder or is applied to a television system to be displayed as a moving picture on the television CRT.

A still video magnetic disc 21 is rotatively driven at a constant rotational speed, e.g. 3,600 rpm, by a disc motor 23. The magnetic disc 21 is contacted by a recording magnetic head 22 and has a core in close proximity to which a phase detector 25 is disposed for generating a phase detection pulse PG each time the magnetic disc 21 makes one full revolution. The magnetic head 22 is moved radially relative to the magnetic disc 21 by a feed mechanism in order to be positioned on a prescribed track of the disc. The phase detection pulses PG are applied to a servo-control circuit 24 of motor 23 and to the control unit 10.

A shutter release button 30 is of the type having a two-step stroke. Pressing the button 30 through the first step of its stroke closes a switch S1, and pressing the button 30 through the second step of its stroke closes a switch S2.

In order to perform strobe photography, the still video camera is provided with a strobe 31, a charging circuit 32 for accumulating the charge that supplies the instantaneous current which drives the strobe, and a switch 33 for providing the strobe with the charging current from the charging circuit 32. The switch 33 is controlled by the control unit 10. The charging circuit 32 is composed of circuitry for outputting a strobe ready signal to the control unit 10 upon detecting that the charging voltage has attained a predetermined value.

The still video camera further includes a color temperature sensor 40 for measuring the color temperature of the illuminating light in order to adjust the video signal for color balance. As is well-known in the art, the sensor 40 comprises light-receiving elements 43, 44 for receiving light incident thereon through R (red) and B (blue) filters 41, 42, respectively, logarithmic amplifier circuits 45, 46 for amplifying the outputs of the elements 43, 44, respectively, and a differential amplifier circuit 47 for producing a signal representing the difference between the outputs of the amplifier circuits 45, 46. The output signal produced by the differential amplifier circuit 47 is converted into a digital quantity by an A/D converter circuit 48 and is inputted to the control unit 10.

The still video camera has a still mode and a movie/-still mode, in which "movie" refers to a moving or animated picture. A video signal appears at the output terminal 16 in the movie/still mode but not in the still mode.

The camera is equipped with main and auxiliary power supplies, which are not shown. In the still mode, the control unit 10 is kept in a standby state by the auxiliary power supply at times other than when photography is taking place. The main power supply is turned on when photography starts, as will be described hereinbelow.

Figure 2:
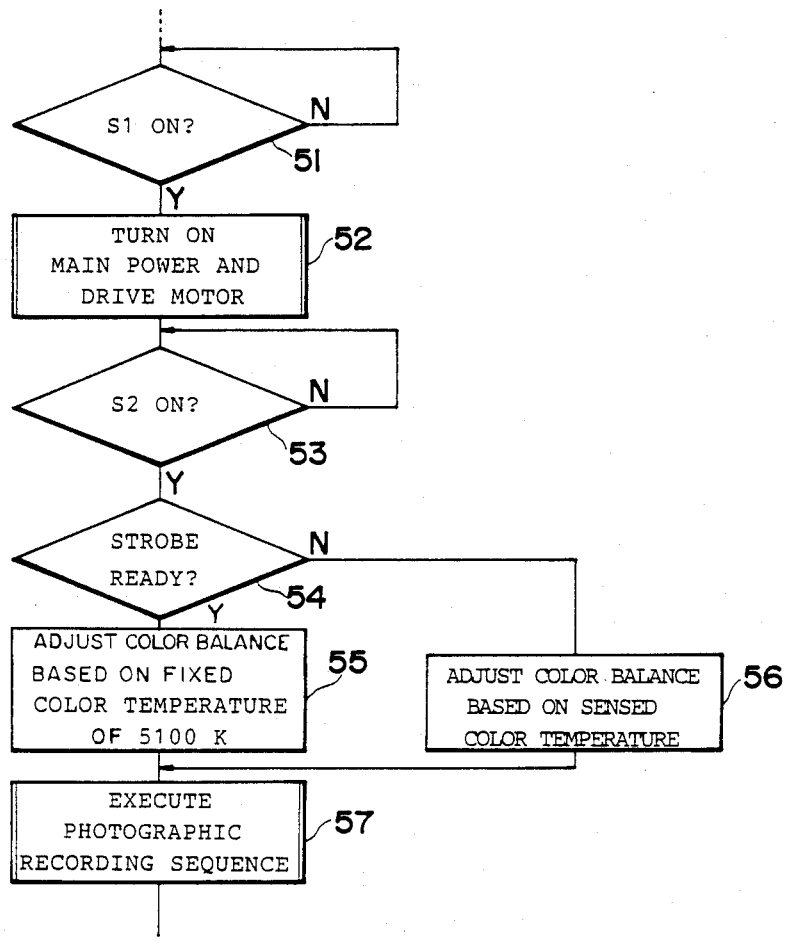
FIG. 2 is a flowchart illustrating photographic processing performed by the still video camera in a still mode.

Part of the operation that takes place in the still mode will now be described with reference to the flowchart of FIG. 2.

When the control unit 10 is in the standby state and the release button 30 is pressed through the first step of its stroke, the switch S1 is closed, i.e. turned on at a step 51. In response, the main power supply provides power to the various circuits inclusive of the motor 23, which starts operating at a step 52.

When the release button 30 is pressed through the second step of its stroke, the switch S2 is turned on at a step 53. In response, the control unit 10 checks at a step 54 whether the charging circuit 32 is providing it with the strobe ready signal. Preferably, the arrangement is such that the power to the charging circuit 32 can be turned on in advance by a manual switch.

If the strobe ready signal is being applied to the control unit 10, this indicates still picture photography using the strobe is to be performed. Therefore, the color temperature of the strobe is set at e.g. 5100 K, and a color balance adjustment based on this color temperature is performed at a step 55. More specifically, the gains of the amplifier circuits 11 through 13 are determined in the control unit 10 on the basis of the set color temperature, and the control unit 10 applies command signals to the amplifier circuits 11 through 13 to set them to these gains.

If the strobe ready signal is not being applied to the control unit 10, the output of the color temperature sensor 40 is read in by the control unit 10, which then proceeds to adjust the gains of the amplifier circuits 11 through 13 based on the control temperature read from the sensor 40 (step 56).

Thereafter, the video camera proceeds to a photographic recording sequence at a step 57. Specifically, the control unit 10 outputs a shutter open signal. In the case where the strobe is ready, the control unit 10 outputs an ON command signal to the switch 33. As a result, the shutter is opened and the strobe is fired by closure of the switch 33. Further, the control unit 10 provides the gate circuit 17 with a gate opening signal for a length of time equivalent to one period of the phase detection pulses PG. The video signal which has been picked up and processed is applied to the magnetic head 22 through the gate circuit 17. Thus, a video signal representing one still picture is recorded on a predetermined track of the magnetic disc 21 during one revolution of the disc.

When the above sequence ends, the main power supply is turned off and the motor 23 stops.

In the movie/still mode, the video signal of the subject imaged by the optical system appears at the output terminal 16 at all times. Accordingly, the main power supply is on at all times. Preferably, the motor 23 is at rest. The output of the color temperature sensor 40 is read in at fixed time intervals and the color balance adjustment is performed on the basis of the sensed color temperature. The shutter is left open.

When the release button 30 is pressed to close the switch S1, the motor 23 is driven into operation. Then, when the switch S2 is closed by further depression of the release button 30, the control unit 10 checks whether the ready signal is being received from the charging circuit 32. If the ready signal is being received, color balance is adjusted based on the color temperature of 5100 K. In the absence of the ready signal, the color balance adjustment continues to be performed based on the output of the color temperature sensor 40. Since the shutter is open, in the photographic sequence the gate circuit 17 is controlled, and the switch 33 is closed only if the strobe is ready. If photography ends when the strobe is in the ready state, the color balance adjustment is again performed on the basis of the output from the color temperature sensor 40.

As many apparently widely different embodiments of the present invention can be made without departing from the spirit and scope thereof, it is to be understood that the invention is not limited to the specific embodiments thereof except as defined in the appended claims.

What is claimed is:

1. A still video camera, comprising:
    a shutter release switch for opening a shutter of said camera;
    a color temperature sensor for sensing the color temperature of ambient light;
    a color balance adjustment circuit for adjusting the color balance of a plurality of color video signals produced by an image pickup system of said camera;
    detector means for detecting the completion of operations required for strobe light emission and outputting a signal corresponding thereto; and
    control means for controlling the operation of said color balance adjustment circuit in response to an activation of said shutter release switch which initiates execution of a photographic recording sequence, including
        means for causing said color balance adjustment circuit to adjust the color balance of said plurality of color video signals on the basis of the color temperature sensed by said color temperature sensor in response to the absence of said signal from said detector means, and
        means for causing said color balance adjustment circuit to adjust the color balance of said plurality of color video signals on the basis of a predetermined constant color temperature in response to said signal form said detector means.

2. The still video camera according to claim 1, wherein said shutter release switch comprises a two-step stroke-type switch in which first and second switches are closed in succession in dependence upon the length of a stroke of a release button, said control means having means for checking whether said signal from said detector means has been outputted when said second switch is closed.

3. The still video camera according to claim 2, further comprising:
    a drive motor for rotating a still video magnetic disc which records a video signal representing a still image, said video signal being produced from said plurality of color video signals after color balance adjustment thereof, and
    motor control means for activating said drive motor when said first switch is closed.

4. The still video camera according to claim 1, further comprising a signal processing circuit for outputting a television video signal of a prescribed format upon subjecting color-balanced video signals from said color balance adjustment circuit to predetermined processing.

* * * * *